US012779496B2

(12) United States Patent
Sparapani et al.

(10) Patent No.: US 12,779,496 B2
(45) Date of Patent: Nov. 3, 2026

(54) MECHANICAL REFLECTION AND IRRADIATION SYSTEM FOR CROSS-LINKING UV POLYMERIZABLE PAINTS

(71) Applicant: INDUSTRIA CHIMICA ADRIATICA—S.P.A.—IN SIGLA ICA S.P.A., Civitanova Marche (IT)

(72) Inventors: Luca Sparapani, Civitanova Marche (IT); Fabio Paniccia, Civitanova Marche (IT); Luigino Giacchetta, Civitanova Marche (IT)

(73) Assignee: INDUSTRIA CHIMICA ADRIATICA—S.P.A.—IN SIGLA ICA S.P.A., Civitanova Marche (IT)

( * ) Notice: Subject to any disclaimer, the term of this patent is extended or adjusted under 35 U.S.C. 154(b) by 506 days.

(21) Appl. No.: 17/293,319

(22) PCT Filed: Dec. 5, 2019

(86) PCT No.: PCT/IB2019/060484

§ 371 (c)(1),
(2) Date: May 12, 2021

(87) PCT Pub. No.: WO2020/115700

PCT Pub. Date: Jun. 11, 2020

(65) Prior Publication Data

US 2022/0008952 A1 Jan. 13, 2022

(30) Foreign Application Priority Data

Dec. 6, 2018 (IT) ........................ 102018000010863

(51) Int. Cl.

*B05D 3/06* (2006.01)
*B05C 11/00* (2006.01)
*B05D 5/02* (2006.01)

(52) U.S. Cl.

CPC .............. *B05D 3/067* (2013.01); *B05C 11/00* (2013.01); *B05D 5/02* (2013.01)

(58) Field of Classification Search

None
See application file for complete search history.

(56) References Cited

U.S. PATENT DOCUMENTS 3,924,022 A 12/1975 Schroeter et al.
4,411,931 A 10/1983 Doung (Continued)

FOREIGN PATENT DOCUMENTS

DE 19810455 A1 9/1999
DE 102006042063 A1 3/2008

(Continued)

OTHER PUBLICATIONS

International Search Report for corresponding PCT/IB2019/060484, dated Mar. 25, 2020.

(Continued)

*Primary Examiner* — Eliza W Osenbaugh-Stewart
(74) *Attorney, Agent, or Firm* — Tucker Ellis LLP

(57) ABSTRACT

A mechanical reflection and irradiation system applicable to common ovens for cross-linking, induced by Excimer lamps, of UV-curable paints applied to three-dimensional (Continued)

elements, such as door parts, doors, panels, windows etc., with cubic elements, parallelepipeds and other solids of rotation and in any case of elements in general characterized by combinations of flat and vertical surfaces to obtain ultra-matt surfaces.

20 Claims, 5 Drawing Sheets

(56) References Cited

U.S. PATENT DOCUMENTS

| | | | | |
|---|---|---|---|---|
| 4,483,884 | A | 11/1984 | Troue | |
| 5,116,639 | A * | 5/1992 | Kolk | A47B 83/001 427/520 |
| 5,888,617 | A * | 3/1999 | Roth | B05D 3/068 427/508 |
| 8,164,263 | B2 | 4/2012 | Morimoto et al. | |
| 2004/0065852 | A1* | 4/2004 | Harrell | A43D 25/20 250/504 R |
| 2011/0147356 | A1 | 6/2011 | Leonhardt | |
| 2014/0371384 | A1* | 12/2014 | Fischer | B05D 3/067 524/556 |
| 2015/0053533 | A1* | 2/2015 | Osswald | B65G 47/847 198/608 |
| 2021/0316520 | A1* | 10/2021 | Evans | B05D 3/067 |

FOREIGN PATENT DOCUMENTS

| | | | |
|---|---|---|---|
| DE | 102008024149 | A1 | 12/2009 |
| DE | 102010038802 | A1 | 2/2012 |
| DE | 102013005741 | B3 | 5/2014 |
| DE | 102016120878 | A1 | 5/2017 |
| DE | 102017008353 | B3 | 8/2018 |
| EP | 0382513 | A2 | 8/1990 |
| EP | 2857221 | B1 | 5/2018 |
| WO | 2005076894 | A2 | 8/2005 |
| WO | 2007068322 | A1 | 6/2007 |
| WO | 2012013364 | A1 | 2/2012 |
| WO | 2013092521 | A1 | 6/2013 |
| WO | 2017137211 | A1 | 8/2017 |
| WO | 2019202009 | A1 | 10/2019 |

OTHER PUBLICATIONS

Written Opinion of the International Searching Authority for corresponding PCT/IB2019/060484, dated Mar. 25, 2020.

* cited by examiner

MECHANICAL REFLECTION AND IRRADIATION SYSTEM FOR CROSS-LINKING UV POLYMERIZABLE PAINTS

FIELD OF THE INVENTION

The present invention relates to a mechanical reflection and irradiation system applicable to standard Excimer lamp-induced crosslinking ovens, of UV polymerizable paints applied to three-dimensional elements, such as furniture doors, doors, panels, windows etc., to cubic elements, parallelepipeds and other rotation solids and in any case to elements generally characterized by combinations of flat and vertical surfaces to obtain ultra matt surfaces.

BACKGROUND OF THE INVENTION

The production of "low gloss" painted surfaces (less than 5 Gloss Unity GU, measured with a geometry at 60° according to the standard UNI EN ISO 2813/2016), is one of the main objectives in the field of industrial painting. "Low gloss" surfaces give products a much sought-after aesthetic effect, especially in the wood-furniture, plastic and glass sectors, because they can create a very natural appearance in combination with tactile effects, of the "soft touch" type or surface textures that contribute to giving greater emphasis to the materiality of the article.

At present, the creation of "low gloss" matt surfaces involves the use of coating products the formulation of which contains matting agents made from organic and/or inorganic substances which, by positioning themselves on the coated surface and/or emerging on it, are able to act on the degree of reflection of light, giving the observer the visual sensation of a matt surface. However, the use of matting agents produces a worsening of the surface performance of the coating film since, not being involved in the cross-linking and polymerisation process, they lead to a significant reduction in scratch resistance, measured in compliance with the standards ASTM 3363/2005 and UNI EN ISO 15184/2013, of "mar-resistance" or resistance of the polish to nail scratches, resistance to chemical agents and abrasion resistance, measured in compliance with DIN ISO and ASTM standards (ISO 11998, DIN 13300, ASTM D 4213). Moreover, the incorporation of these matting agents in the formulation of the coating product significantly influences the "rheology" (scientific discipline that studies the equilibrium achieved in a material which flows or deforms due to a state of stress) strongly modifying the viscosity thereof to the point that it is impossible to use high concentrations of such matting agents without negatively altering the "application" characteristics of the coating product.

A particular category of surface coatings is that of paints polymerizable by ultraviolet radiation (UV), characterized by a cross-linking mechanism that involves the use of actinic sources or ultraviolet radiation lamps (UV). UV lamp-induced cross-linking surface coatings may contain solvents, water and other coalescing substances in their formulation, or be characterized by a 100% dry residue when their viscosity is adjusted by the addition of reactive monomers. These formulations are characterized by the high chemical-physical properties of the coatings which can be made with them, generally superior to those obtained using other surface coatings.

The UV lamp-induced cross-linking process indeed makes it possible to obtain a high density "polymer network". In addition, the UV lamp-induced cross-linking process takes place in a very short time (milliseconds) so as to achieve high industrial productivity compared to other paint system technologies. Unlike solvent and water-based surface coatings, which cannot be UV cross-linked, the matting process of the coating film is not linked to the phenomenon of "shrinkage", i.e. the reduction of the thickness of the coating film during its drying. This process introduces strong limitations and a clear difficulty in creating low gloss surfaces since it requires the use of large amounts of matting agents (>10%), with consequent negative effects on the rheological and performance properties of the coating film.

To obtain ultra-matt surfaces with UV-induced cross-linking paints, two technologies are currently used to obtain high-performance surfaces:

1) the "Inert Calender" technology, which consists of the use of smooth or structured polyester films, to be applied on a liquid paint film even without the use of matting agents by coupling on a calender, and subsequent cross-linking through UV lamp-induced polymerisation. This process, where used as a source of UV radiation of LED lamps, is the subject of the ICA Patent EP3122475 A1,
2) Excimer lamp technology. The Excimer lamp is a monochrome UV lamp with emission in the UV-C band. Unlike normal UV lamps, which emit a wide spectrum of radiation in the wavelength range from 400 to 315 nm, the Excimer lamp is designed to emit monochromatic radiation in the range from 280 to 100 nm. The Excimer lamp consists of a glass or quartz casing, containing therein an inert gas "doped" with metals, so as to obtain monochromatic radiation of maximum intensity in a single emission frequency. Lamps of this type induce a partial polymerization only on the surface of the coating film, creating a surface effect called "micro-folding", characterized by a low opacity and a "soft feel" touch effect. This effect is achieved without the use of matting agents or with very limited use thereof, and is therefore associated with high chemical-physical characteristics of resistance to scratching, chemical agents and abrasion of the painted surface. Following the realization of the "micro-folding" effect using Excimer lamps, the completion of the cross-linking process of the coating film involves the use of normal UV lamps or LED lamps or radiation generated by Electron Beam. To obtain the "micro-folding" effect, it is essential that the environment between the Excimer lamp and the coating film is low in oxygen. Since the presence of oxygen inhibits the "micro-folding" process, it is necessary to use the Excimer lamp in the presence of a nitrogen-induced inert atmosphere, as well as surface coatings with specific formulations for this particular cross-linking process.

The use of inert atmospheres (without oxygen) makes it possible to obtain much higher cross-linking densities than those achieved with cross-linking in the natural atmosphere (presence of oxygen), eliminating the inhibition factor exerted by oxygen on the cross-linking process. In particular, oxygen reacts on the surface of the coating film with the photo-initiator present in the UV paint formulation, producing an interface layer in which the cross-linking components are no longer active, with the final result of cancelling or strongly limiting the "micro-folding" effect.

In both cases, "inert calender" technology and Excimer lamp-induced cross-linking coating, the use of mattifying agents in the formulation of the coating product is virtually nil or minimal. For this reason, with the same coating film obtained by cross-linking the coating product, the matt surfaces resulting from the application of these two technologies have chemical and physical characteristics much more efficient than those obtained using surface coatings that contain significant concentrations of matting agents, responsible for the strong elements of discontinuity originating in the polymer network.

In the state of the art, the two “inert calender” and coating with Excimer lamp-induced cross-linking, technologies can only be used on flat surfaces and not on three-dimensional elements, such as furniture doors, doors, panels, windows, etc. The “inert calender” technology can only be used on flat surfaces since the coupling of the polymer film on the UV cross-linkable coating film can only be achieved by the use of a flat calender. The technology involving the use of Excimer lamps is related to the need to use an inert atmosphere during the exposure of the coating film to the radiation of the lamp. Excimer lamps are generally placed on flat supports and arranged on mechanised transports. The realization of an area in which an oxygen-free atmosphere, or a controlled oxygen concentration, is maintained during the Excimer cross-linking process limits the use of this technology to flat elements or, at most, to elements with regular geometry which can rotate in front of an Excimer type radiation source, such as bottles and other cylindrical containers.

In the state of the art, in the case of coating three-dimensional elements for which a matt surface is to be obtained also on the edges as well as on the flat surfaces, the only technique available is that “edge banding”, which consists of applying to the edges of the three-dimensional element polymer-based elements (ABS, PVC, PP) or wooden-based elements, pre-coated with paints which ensure that identical coating films in terms of chemical-physical and performance characteristics as those of the flat surfaces are obtained.

With regard to the use of Excimer lamps for cross-linking UV polymerizable surface coatings, the following documents are known to the state of the art:

- EP2794126B1 which discloses a process for obtaining matt surfaces by using Excimer lamps for paints applied thickly (>20 μm) using a pre-gelling process by means of UV lamps;
- EP2598561A1 which discloses a process for obtaining matt surfaces on plastic material such as PMMA by the use of Excimer lamps and paints containing nano-technological silica in order to obtain high surface resistance;
- U.S. Pat. No. 8,164,263B2 which discloses a method for producing Excimer lamps;
- EP2786807B1 which discloses a machine for obtaining ultra-matt surfaces by using Excimer lamps on flat panels;
- EP2857221B1 which discloses a method for obtaining ultra-matt surfaces on panels for the flooring industry using Excimer lamps in combination with Electron Beam;
- WO2017137211A1 which discloses a method for making inertized UV and Excimer lamps;
- WO2007068322A1 which discloses a method for obtaining ultra-matt surfaces in controlled inert atmospheres using water-cooled 172 nm UV-C sources;
- WO2017076901 which discloses a method for obtaining three-dimensional surfaces on flat substrates with the aid of Excimer lamps and a pre-gelling system consisting of UV-C lamps;
- WO2007068322A1 which discloses a process for obtaining matt surfaces using pigmented and transparent paints with electron-beam and excimer lamp cross-linking;
- DE102006042063A1 which discloses a method for obtaining matt surfaces with three-dimensional effects by adjusting the time between the micro-folding process and the final polymerization via UV lamps or electron beams.

In the state of the art, following documents are also known:

- U.S. Pat. No. 4,483,884 which discloses a process for obtaining a textured and photo-polymerized coating on a substrate via UV lamps, in which said coating has a thickness approximately from 0.1 mil to approximately 10 mil;
- DE102017008353 which discloses the conditions for obtaining a micro-folding process which is considered to be optimal in photo-polymerized coatings, in which the coating is irradiated with mono-chromatic radiations with a short wavelength of a low-pressure mercury lamp;
- U.S. Pat. No. 4,411,931 which discloses a three-steps UV polymerization process in which a cross-linked substrate with UV beams is initially exposed to a light with a low intensity wavelength, by gelling the lower portion of the substrate and leaving substantially unchanged the upper surface. The resulting products can be used as coatings for surfaces and in particular as coating for floorings and walls.

In the state of the art, from the documents cited above, the extension of irradiation to those points of a flat or three-dimensional element not directly exposed to a lamp in order to obtain better quality coated products is not known of. Furthermore, by means of the known processes and systems the portion of said elements which are not directly exposed to the lamp, also defined as edges of a three-dimensional element, remains non completely covered by the paint and therefore they create points of discontinuity on the products so obtained.

DISCLOSURE OF THE INVENTION

The purpose of the present invention is to solve the problems relating to the state of the art through the extension of the irradiation of both the Excimer lamp and that of the pre-gelling system to the points of a three-dimensional element not directly exposed to a lamp.

Another purpose of the present invention is to extend obtaining ultra-matt surfaces also on the edges or on the areas of a three-dimensional element which cannot be achieved via traditional processes and devices.

Another purpose of the present invention is to avoid the use of the “edge banding” technique.

Another purpose of the present invention is to obtain an increase in the speed of realization of the coated three-dimensional article.

A further purpose of the present invention is to obtain an improvement in the quality of the coated three-dimensional article.

A no less important purpose of the present invention is to achieve flexibility in the processing cycles not otherwise achievable with the technologies available in the state of the art.

Further characteristics and advantages of the invention will be clearer from the description of a preferred but not exclusive embodiment of the mechanical system of the present patent application, illustrated by way of and indicative but non-limiting example in the appended drawings below:

FIG. 1 shows in axonometric view a mechanical system (1) designed to extend the irradiation of Excimer UV radiation to the shaded areas of a coated three-dimensional element or support (2), wherein said mechanical system (1) is composed of:

- a lower reflecting element (3*a*);
- an upper reflecting element (3*b*);
- two lateral reflecting elements (4*a*, 4*b*);
- at least one LED lamp (5*a*);
- at least one Excimer lamp (5*b*);
- at least one UV lamp (5*c*);
- two translation guides (6*a*, 6*b*) for moving the three-dimensional element (2);

FIG. 2 shows in a lateral view the mechanical device (1) in FIG. 1. wherein:

- (A) represents the angle of inclination of the lateral reflecting elements (4*a*, 4*b*);
- (C) represents the adjustment distance of the lateral reflecting elements (4*a*, 4*b*);
- (D) represents the adjustment distance of the LED lamp (5*a*), of the Excimer lamp (5*b*) and of the UV lamp (5*c*) with respect to the coated support (2);

FIG. 3 shows in a view from above the mechanical system (1) in FIG. 1. wherein:

- (B) represents the angle of inclination of the Excimer lamp (5*b*);
- (E) represents the adjustment angle of the UV lamp (5*c*).

Figure 1:
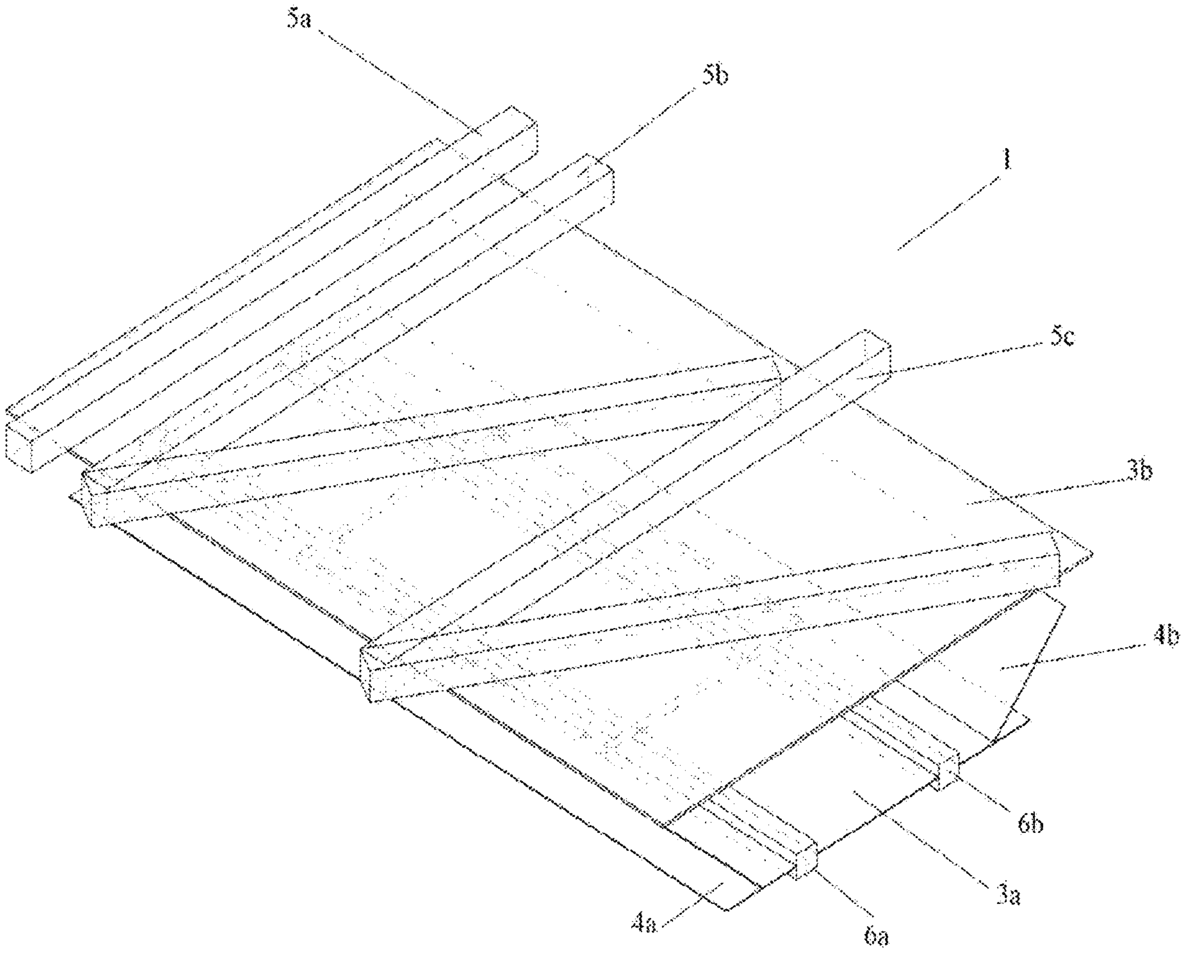

These and other purposes are achieved with the present invention which relates to a mechanical reflection and irradiation system applicable to standard Excimer lamp-induced cross-linking ovens of UV polymerizable coatings applied to three-dimensional elements, such as furniture doors, doors, panels, windows etc., to cubic elements, parallelepipeds and other rotation solids and in any case to elements generally characterized by combinations of flat and vertical surfaces to obtain ultra-matt surfaces.

DETAILED DESCRIPTION OF THE INVENTION

According to the present invention, the terms "ultra-matt paint" and "low-gloss" coated surfaces are meant to refer to surfaces which reflect light with a brightness degree lower than 5 Gloss Unity GU, measured with a geometry at 60° according to the UNI EN ISO 2813/2016 standard.

According to a preferred—but not limiting—embodiment, the present invention relates to a mechanical system (1) of reflection and irradiation applicable to normal cross-linking ovens, induced by Excimer lamps of UV polymerizable paints applied to a three-dimensional element or support (2), such as for example furniture doors, doors, panels, windows etc., to cubic elements, parallelepipeds and other rotation solids and in any case to elements generally characterized by combinations of flat inclined vertical surfaces for obtaining ultra-matt surfaces. According to the invention, following elements are also comprised:

- the flat surfaces,
- the curved surfaces, where curved refers to convexity and concavity,
- the profiles of said flat and curved surfaces, all surfaces being disposed vertically, horizontally and inclined in the space.

Said mechanical system (1) consists of:

- a lower reflecting element (3*a*);
- an upper reflecting element (3*b*);
- two possible lateral reflecting elements (4*a*, 4*b*);
- at least one possible LED lamp (5*a*);
- at least one Excimer lamp (5*b*);
- at least one possible UV lamp (5*c*);
- one or more, for example two translation guides (6*a*, 6*b*) for moving the three-dimensional element (2).

Said mechanical system (1) can be applied either to the only cross-linking surface area [step(4)] as explained below, or also independently to each of the pre-gelling steps [step (3)] with the aid of the LED lamp (5*a*) and the final polymerization [step(5)] with the aid of the UV lamp (5*c*).

The production of ultra-matt painted surfaces with low light reflection (low "gloss") and high physical chemical performance by using UV cross-linkable coating products takes place by means of a process consisting of the following steps:

1) application of the UV cross-linkable coating product,
2) possible evaporation of solvents and/or coalescents or water on a "flash off" plant,
3) pre-gelling,
4) polymerization (cross-linking) of the surface layer of the coating film, induced by Excimer lamps (5*b*),
5) final polymerization (cross-linking) of the coating film.

Ultra-matt surfaces with low "gloss" on three-dimensional elements (2) (flat and vertical surfaces such as edges of products such as furniture doors, doors, panels, windows, etc.) are obtained by combining the use of UV coating products with a mechanical reflection and irradiation system (1) of the radiation produced by Excimer lamps of this patent application. In detail, the steps of the process indicated above, which allow ultra-matt surfaces with low "gloss" to be obtained and which can be applied not only to flat surfaces, but also and above all to three-dimensional products thanks to the system (1) of this patent application, are described below.

1) The application of the coating products is carried out using the coating systems known in the state of the art, in particular the manual and/or mechanised spray coating system using paint robots. The coating film applied may have a thickness ranging from 30 to 300 microns.
2) The evaporation of solvents and/or coalescents and/or water, present in the formulation of the coating products, can be achieved by means of a "flash off"/evaporation system known in the state of the art, which uses a laminar air flow in combination with heating systems consisting of IR lamps, or any other instrument, combined with low intensity UV lamps (TI lamps).
3) The pre-gelling process of the coating products must be applied to coating films of a thickness of more than 10 microns on flat surfaces and edges of three-dimensional elements and consists of achieving a pre-polymerization of the inner layer of the film, while the outer surface layer remains in the liquid state for a thickness of about 10 microns. The pre-gelling process is induced and controlled using UV radiation sources such as low power UV lamps (EP2794126B1), LED lamps (5*a*), UV-C lamps. Depending on the emission profile and power of the UV radiation chosen for the pre-gelling process, the thickness of non-pre-gelled liquid paint that remains on the outer surface of the coating film influences and determines some characteristics of the finished product, such as the three-dimensional effects of the "soft touch" type (extreme softness to the touch induced by a micro-roughness of the surface layer) and/or surface texturing, as well as determining the intensity of the "gloss" and the chemical-physical characteristics of resistance to scratching, abrasion and chemical agents of the coating film and the intensity of its adhesion to the coated surface. In addition, the pre-gelling process makes it possible to obtain the textured effects and characteristics previously described also on more regular geometric structures such as hemispheres or regular three-dimensional "patterns" (DE102016120878A1).

4) The surface polymerization/cross-linking process of the coating products applied to flat surfaces and edges of three-dimensional elements is induced by Excimer lamps (5*b*) with air or water-cooled UV radiation of 172 nm and power between 0.5 and 50 W/cm. The polymerization/cross-linking process takes place in an inert nitrogen atmosphere with oxygen levels between 1 and 1.000 ppm.

5) The final polymerization/cross-linking process of coating products applied to flat surfaces and edges of three-dimensional elements involves the use of one or more Gallium UV lamps (5*c*) in combination with one or more Mercury lamps with powers between 80 and 250 W/cm, or alternatively with UV LED lamps, with radiation emission at wavelengths between 300 and 420 nm, and powers between 2 and 20 W/cm.

The object of this patent application consists of a mechanical reflection and irradiation system (1) of UV radiation applicable to standard Excimer lamp cross-linking ovens and such as to allow the irradiation to be extended also to points of the three-dimensional element not directly exposed to the lamp (shaded areas), in combination with coating products to be applied on flat surfaces and edges of three-dimensional elements to achieve the polymerization/cross-linking of the coating film without having to resort to the "edge banding" technique and obtain surfaces with low "gloss" and high performance characteristics in terms of resistance to scratches, abrasion, chemical agents. Said innovative mechanical system (1), non-existent in the state of the art, is advantageously used in the pre-gelling, polymerization/surface cross-linking steps induced by Excimer lamps (5*b*) and final polymerization/cross-linking of the coating film.

Figure 2:
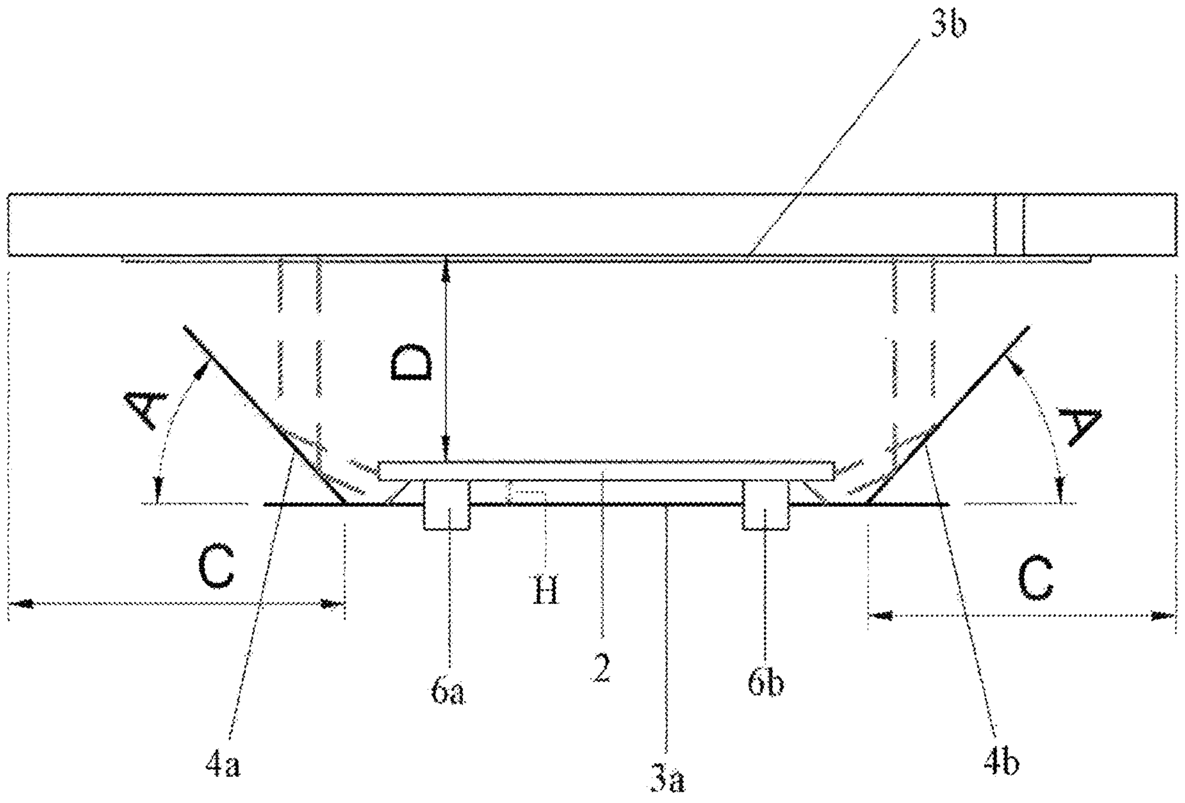
Figure 3:
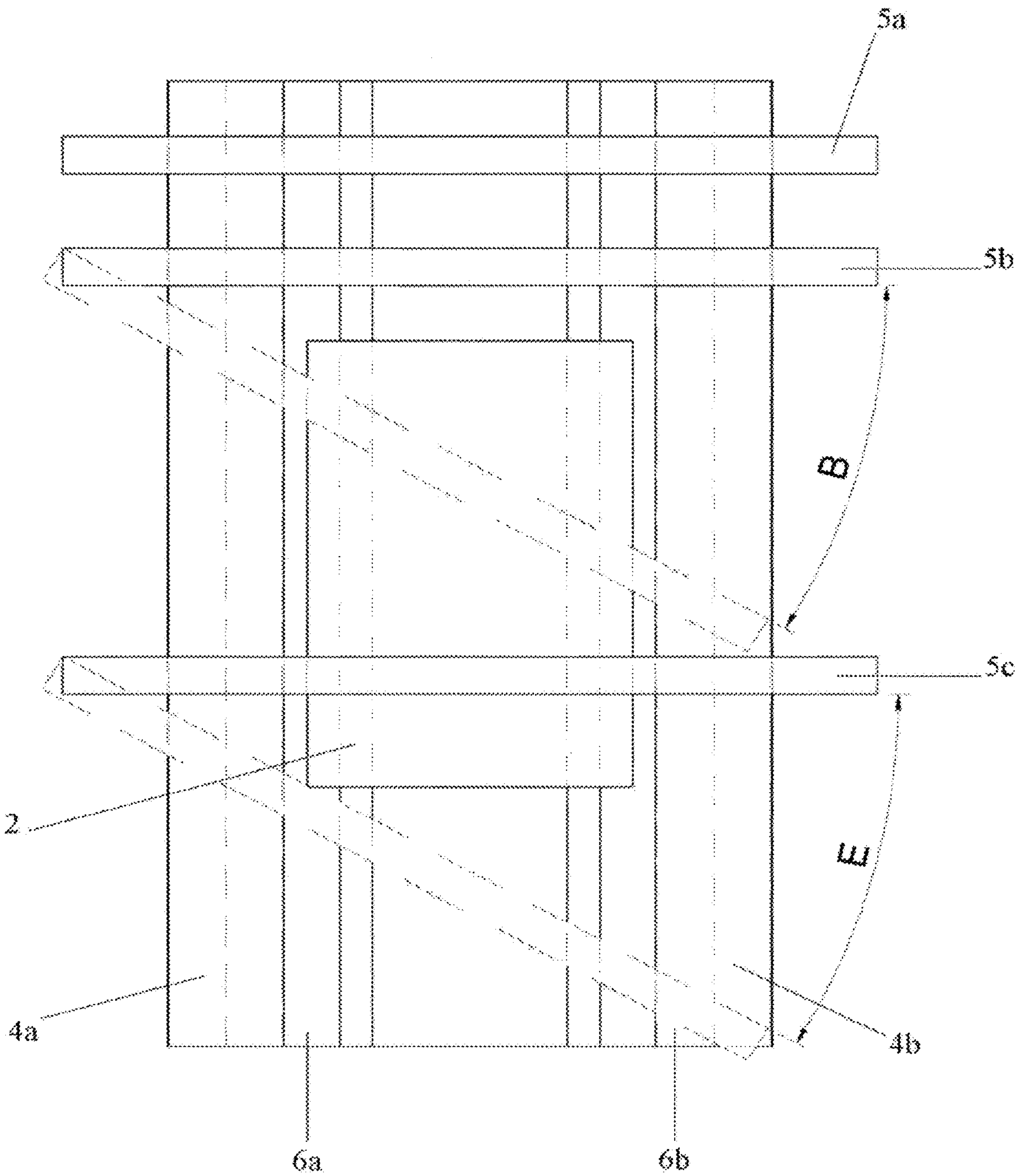
Figure 4:
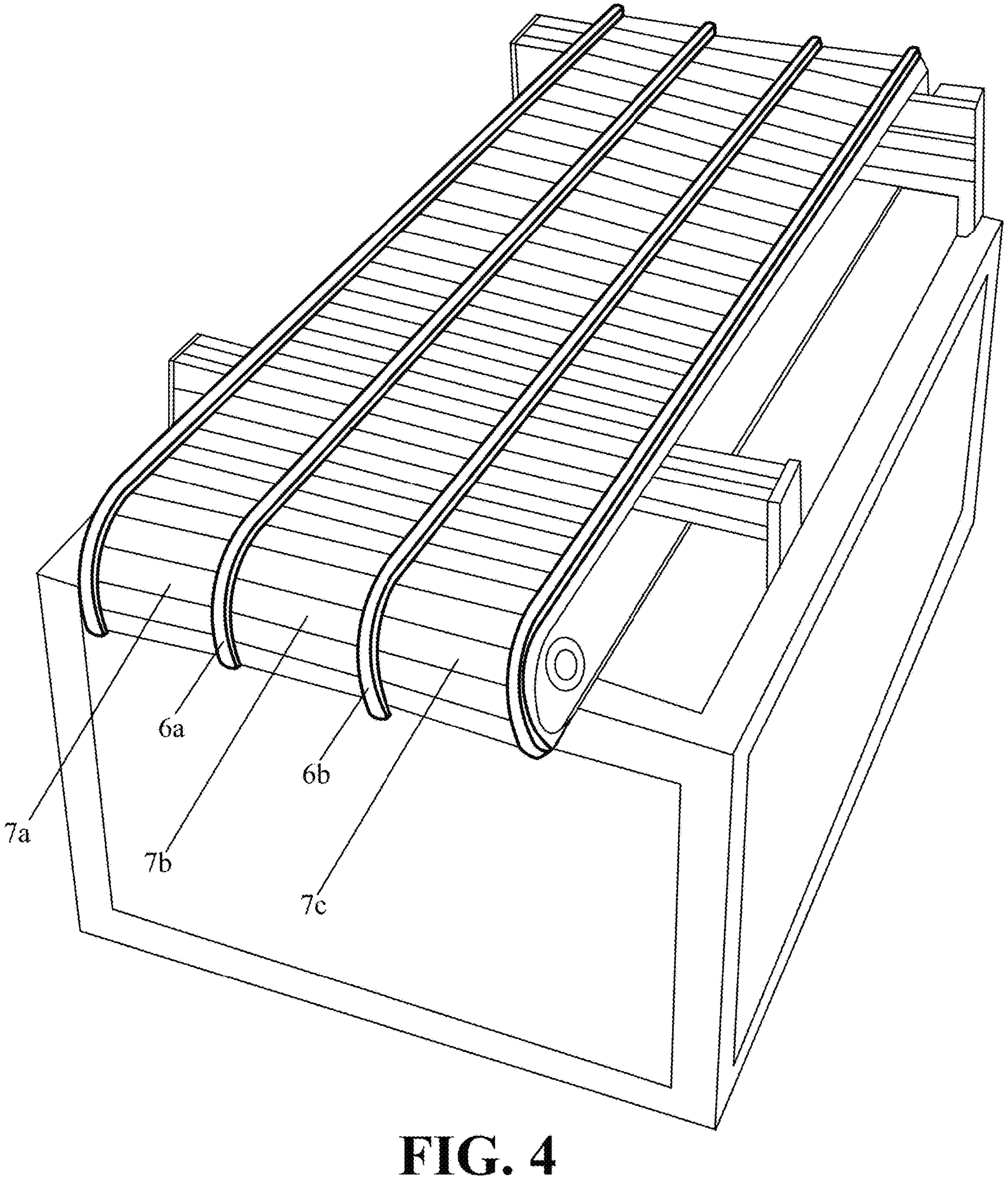
FIG. 4 shows in an axonometric view the translation guides (6*a*, 6*b*) and the transport and moving system of the (not shown) three-dimensional element (2) made of one or more chain elements (7*a*, 7*b*, 7*c*) to be associated with the mechanical system (1) of FIGS. 1-3.
Figure 5:
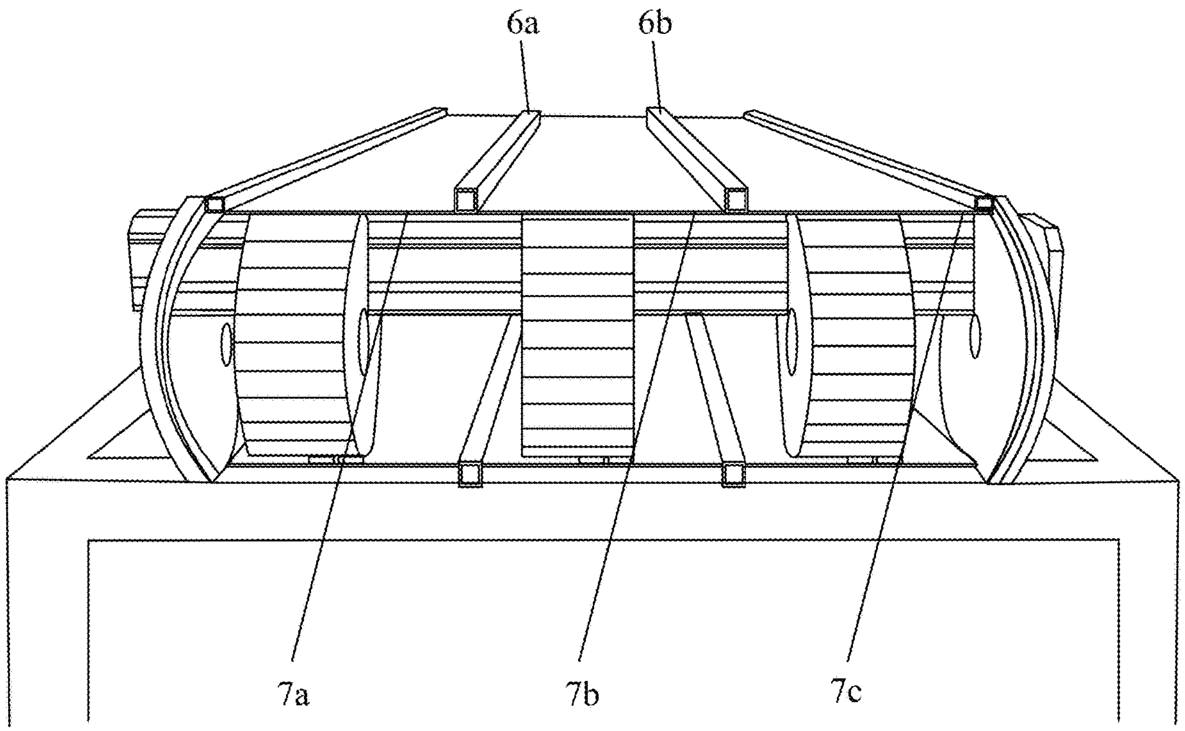
FIG. 5 shows in a front perspective view what was described in FIG. 4.

The mechanical system (1) can be conceived either as a single apparatus where the three pre-gelling steps (step 3), Excimer surface polymerization/cross-linking (step 4), final polymerization/cross-linking (step 5) occur continuously (FIGS. 1-3), or as an apparatus consisting of three separate sections in which the three pre-gelling steps (step 3), Excimer surface polymerization/cross-linking (step 4), final polymerization/cross-linking (step 5) can be conducted separately in a discontinuous manner.

In the case of three separate sections (embodiment non shown), the section relating to step 4 will comprise the following elements:

a lower reflecting element (3*a*);
an upper reflecting element (3*b*);
two possible lateral reflecting elements (4*a*, 4*b*);
at least one Excimer lamp (5*b*);
one or more, for example two translation guides (6*a*, 6*b*) for moving the three-dimensional element (2).

Each further section, applicable independently to step 3 and step 5 will comprise lower (3'*a*) and upper (3'*b*) reflecting elements; possible lateral reflecting elements (4'*a*, 4'*b*); light sources (5*a*) and (5*c*) chosen as a function of the step; one or more translation guides, for example (6'*a*, 6'*b*), for moving the three-dimensional element (2), For the pre-gelling step (step 3) the mechanical system (1) uses one or more radiation sources UV (5*a*) capable of emitting a radiation at a wavelength between 365 and 405 nm, preferably 395 nm, and having a power between 2 and 20 W/cm, preferably 8 Watt/cm. The radiation source (5*a*) is arranged above the coated support (2) perpendicular to the direction of transport or with an inclination of up to 60° (not shown in FIG. 3).

The radiation sources UV (5*a*) with the emission characteristics cited above can be chosen from LED lamps, low power UV arc lamps as gallium, mercury or iron lamps, with power from 10 to 50 W/cm or other UV lamps.

As a UV radiation source (5*a*) also the use of UV lamps can be considered, which are able to produce mono-chromatic wavelengths within the range UV-C (200-300 nm). Each of the UV radiation sources (5*a*) mentioned above, even if it emits radiations with different wavelength, is able to produce an adequate cross-linking even if it leaves the outer surface layer of the paint in the liquid state for a thickness of about 10 μm.

For the Excimer surface polymerization/crosslinking step (step 4) the system uses one or more Excimer lamps (5*b*) capable of emitting radiation at a wavelength preferably of 172 nm and having a power between 0.5 and 50 Watt/cm, with water or air cooling and inert nitrogen atmosphere with oxygen levels between 1 and 1,000 ppm.

The UV radiation source (5*b*), preferably an Excimer lamp or other UV radiation source of similar performances, is arranged above the coated support (2) perpendicular to the direction of transport or with an inclination (B) of up to 60°.

For the final polymerization/cross-linking step (step 5) the system uses one or more Gallium UV lamps (5*c*). The Gallium UV lamps (5*c*) can be chosen between: Gallium UV lamps also in combination with one or more mercury lamps with powers ranging from 80 to 200 W/cm or, alternatively, UV-LED lamps capable of emitting radiation at a wavelength ranging from 300 to 420 nm, preferably 395 nm, and having a power ranging from 2 to 20 Watt/cm, preferably 8 W/cm.

The lamp (5*c*) is arranged above the coated support perpendicular to the direction of transport or with an inclination (E) of up to 60°.

The length of the lamp (5*a*-5*b*-5*c*), covers the entire width of the coated support (2) and protrudes on both sides for a distance (C) of at least 10%, up to 100%, with respect to the width of said support (2).

At the sides, below and above the coated support (2) lateral reflecting elements (4*a*, 4*b*), a lower reflecting element (3*a*) and an upper reflecting element (3*b*), for example mirrors, AISI 316 mirror polished stainless steel elements (EN188-2) are respectively arranged, so that the UV radiation of the pre-gelling LED lamps (5*a*), the Excimer lamps (5*b*) and that of the final cross-linking (5*c*) are reflected to radiate not just the surfaces directly exposed to the UV source, but also the surfaces not directly exposed (shaded areas).

In order to obtain ultra-matt surfaces both on the plain surfaces and on the variably curved surfaces and also on the edges of a three-dimensional element according to the present invention:

- in the pre-gelling step (step 3) and the final polymerization/cross-linking step (step 5), the lateral reflecting elements (4*a*, 4*b*), the lower reflecting element (3*a*) and the upper reflecting element (3*b*), are optional;
- the lateral reflecting elements (4*a*, 4*b*) are optional in the surface polymerization/cross-linking step, also called Excimer step (step 4), as it can be obtained with lamps having performances similar to those of the Excimer lamps;
- the lower (3*a*) and upper (3*b*) reflecting elements are most important in the surface polymerization/cross-linking step, also called Excimer step (step 4) as previously indicated.

It has been found out that, even if the lateral reflecting elements (4*a*, 4*b*) are optional in all steps, it is possible to obtain ultra-matt surfaces also on the edges of the three-dimensional element, as the reflexion mechanism from the reflexion surface is not a direct reflexion mechanism but a diffused reflexion mechanism.

This is possible as a feature of the radiation typology emitted from an Excimer lamp is that, when it meets a reflecting surface, it is subjected to a diffused and not direct radiation. Therefore a precise reflexion angle does not exhist and the diffusion component of the reflecting surface is predominant with respect to the direct one.

The lateral reflective surfaces (4*a*, 4*b*) are equipped with systems for adjusting (not shown) the inclination (A) with respect to the plane or for adjusting the distance (not shown in FIG. 2) with respect to the support (2).

The transport and handling system is designed so that the support (2) is lifted with respect to the lower reflecting element (3*a*) up to a distance (H), preferably of 0.1 mm or more, more preferably from 0.1 mm to 5 cm; particularly preferred is the range from 0.1 mm to 2 cm, so as to allow a uniform UV reflected radiation.

The adjustment distance (D) from the coated support (2) of the LED lamp (5*a*), of the Excimer lamp (5*b*) and of the UV lamp (5*c*) to the Gallium can be adjusted independently for each of them.

The mechanisms for adjusting the inclination of the reflective lateral elements (4*a*, 4*b*) and of the height of the UV radiation sources for the pre-gelling element (5*a*), Excimer (5*b*) and final cross-linking (5*c*) may entail the use of:

- linear motors, brushless motors both stepper and drive;
- recirculating ball screws for height adjustment through the drive of the motor which, via a transmission shaft system, moves said screws synchronously.

Pneumatic systems can also be used to simplify the realization of the mechanical system according to the invention.

It is also possible to use levers to manage the adjustments of the adjustable movable elements such as mirrors and their inclination and distance, the height of the various lamps.

Measurement guides (not shown) or other suitable instruments may be installed to assess the various angles and the positioning of all the reflective elements (3, 4*a*, 4*b*).

All the adjustments can be equipped with control systems (not shown) to detect the actual position of the heights and perform positioning with electronic control systems.

The transport system can be made in a single element for all three steps of the process (pre-gelling, surface polymerization/cross-linking, final polymerization/cross-linking) or in three separate and distinct elements. It may provide for the use of one or more catenary elements (roller chain), or alternatively one or more transmission chains, alternatively two or more free roller chains, alternatively one or more tracked chains, alternatively one or more conveyor belts with or without raised shims, alternatively slatted conveyor belts.

The mechanical system (1) of this patent application, used in combination with the coating products, makes it possible to obtain immediately handled, stackable three-dimensional coated elements, characterized by ultra-matt surfaces with low "gloss" (less than 10) and with very high performance characteristics of resistance to scratches, abrasion and chemical agents, self-repair via induced heat for scratches procured with diamond tip and applied force less than 5 N, relative to all surfaces (flat and edges) of the coated three-dimensional element.

With reference to what described before, tests are shown below which are illustrative and non limiting of the physical-chemical performances of a Excimer lamp UV cross-linking coating product, both on the plane and on the edges of a three-dimensional element with the use of the mechanical system according to the invention.

The test report LABPCF 10049 makes reference to a painting cycle made on a polyester oak support with dimensions 50×50 cm and thickness 2 cm. The finishing is a specific formulation for a UV polymerization with Excimer lamps based on acrylic resins with a total dry residue of 85% and provides a content of matting silicas very low (<1%) (UVX5818F produced by Industria Chimica Adriatica S.p.A.). The final aesthetic result obtained is a surface very soft to the touch, with a very good opacification and gloss uniformity lower than 5 (60°) and 15(85°).

Chemical resistance: a comparison is made between plane and edge. The chemical resistances are identical on both surfaces and are very high.

Scratch resistance: a comparison is made between plane and edge by using the Dur-O-test method with Erichsen pen. The scratch resistances are identical on both surfaces and are very high.

List of Tested Samples

The tests were carried out on the edge and on the plane of the same specimen.

TABLE 1

| Tests performed/Test: Squaring Test, Dur-O-Test, Resistance to cold liquids, Internal light resistance, Thickness - Ultrasonic Thickness meter<br>Used supports/Support: Oak | | | | | | | |
|---|---|---|---|---|---|---|---|
| Phase | Product | Additive | Catalyst | Thinner | Quantity | Time | Comments |
| Manual spray | POLYESTER GROUND | | | | | | PLANE |
| Manual sandpapering | | | | | | | 320 |
| Manual spray | UVX5818F | 2% FI55 | C200 | 5 | 90 | | |
| Pre-gelling tunnel | | | | | | | 5' 35° C. |
| LED lamp | | | | | | | 50% 5 cm 5 m/min |
| LED lamp | | | | | | | Excimer 50% 5 m/min |
| UV 2 tunnel p. lamps | | | | | | | |

Squaring Test (UNI EN ISO 2409: 2013)

Method:

On the painted support, six perpendicular incisions are performed with a special cutting tool spaced 1, 2, or 3 mm depending on the thickness of the paint film. In this way, a lattice consisting of 25 squares is created. This is applied with standard adhesive tape and pulled away in a regular motion. The analyzed surface is evaluated.

Ratings:

0=The edges of the incisions are perfectly intact: no small square has come off.

1=Small flakes of paint are detached at the intersections of the lines for a surface smaller than 5% of the total area.

2=Small flakes of paint are detached at the intersections of the lines for a surface between 5 and 15% of the total area.

3=The paint has detached along the edges of the cracks and in part of the squares for 15-35% of the total area.

4=The separation of the squares involves 35 to 65% of the total area.

5=The detachment is almost total or total.

Usable methods: 1) Single-blade tool; 1a) Manual single blade tool; 1b) Motorized single blade tool; 1c) Cutter with rigid blade with sharp V-shaped edge; 2) Multi-blade tools; 2a) Manual multi-blade tool; 2b) Motorized multi-blade tool Referring to table 2 above, zones 1, 2 and 3 are three randomly chosen positions of the same support. The 2 mm spacing indicates the distance between the individual incisions necessary to realize the lattice indicated in the test description.

TABLE 2

| LAB: 62775<br>Description of specimen<br>Plane<br>SPECIMEN: 1 | | | |
|---|---|---|---|
| Zone | Spacing | Method | Evaluation |
| zone 1 | 2 mm | 1c | 0 |
| zone 2 | 2 mm | 1c | 0 |
| zone 3 | 2 mm | 1c | 0 |

TABLE 2-continued

| LAB: 62984<br>Description of specimen<br>UVX5818F Edge<br>SPECIMEN: 1 | | | |
|---|---|---|---|
| Zone | Spacing | Method | Evaluation |
| zone 1 | 2 mm | 1c | 0 |
| zone 2 | 2 mm | 1c | 0 |
| zone 3 | 2 mm | 1c | 0 |

With reference to above table 2, zones 1, 2 and 3 are three casually chosen positions of the same support. The spacing of 2 mm indicates the distance among the single etchings necessary for realizing the lattice indicated in the test description.

Evaluation of the Resistance of Surfaces to Cold Liquids

UNI EN 12720: 2013

Conditioning

N° 7 days at 23±2° C. and 50±5% relative humidity

Method:

The chemical agents are applied on filter paper placed in contact with the painted surface and covered with watch glass slides. After the time prescribed by the regulations, the surface is cleaned and, after twenty-four hours, the results are evaluated.

For the sake of completeness, the meaning given by the UNI EN 12720 standard to the numbering is reported:

1: Strong change: the tested area is distinguishable in all observation directions. The structure is extremely modified.

2: Significant change: the tested area is distinguishable in all directions of observation. Structural changes (formation of bubbles, fiber lifting cracks) occur as well as changes in opacity and color.

3: Moderate change: the tested area is distinguishable in many observation directions. There are no changes in structure (formation of bubbles, breakages, lifting of the fiber, etc.) but only changes in opacity and color.

4: Slight change: the tested area is distinguishable only in one direction of observation. There are no changes in structure (formation of bubbles, breaks, lifting of the fiber) but only changes in opacity and color.

5: No change: the tested area is not distinguishable from the rest of the sample.

TABLE 3

| Code number: LABPCF_10039_001: Support: Oak Gloss: | | | | | | | | |
|---|---|---|---|---|---|---|---|---|
| Product | | | Additive | | Catalyst | | % cat: | |
| POLYESTER GROUND UVX5818F | | | 2% FI55 | | C200 | | 5 | |
| Chemical agent | 10 sec | 2 min | 10 min | 1 hour | 6 hours | 8 hours | 16 hours | 24 hours |
| Acetic acid 10% | | 5 | | | | | | |
| Citric acid 10% | | 5 | | | | | | |
| Water | | | | | 5 | | | |
| Etyl alcohol 48% | | | | 5 | | | | |
| Ammonia 10% | | 5 | | | | | | |
| Coffee | | | | 5 | | | | |
| Liquid paraffin | | | | | 5 | | | |
| Detergent solution | | | | | 5 | | | |
| Basic sweat | | | | | 5 | | | |

| Code number: LABPCF_10049_002: Support: Oak Gloss: | | | | | | | | |
|---|---|---|---|---|---|---|---|---|
| Product | | | Additive | | Catalyst | | % cat: | |
| POLYESTER GROUND UVX5818F | | | 2% FI55 | | C200 | | 5 | |
| Chemical agent | 10 sec | 2 min | 10 min | 1 hour | 6 hours | 8 hours | 16 hours | 24 hours |
| Acetic acid 10% | | 5 | | | | | | |
| Citric acid 10% | | 5 | | | | | | |
| Water | | | | | 5 | | | |
| Etyl alcohol 48% | | | | 5 | | | | |
| Ammonia 10% | | 5 | | | | | | |
| Coffee | | | | 5 | | | | |
| Liquid paraffin | | | | | 5 | | | |
| Detergent solution | | | | | 5 | | | |
| Basic sweat | | | | | 5 | | | |

Determination of Light Resistance

UNI EN 15187: 2007

Method:

The painted panels are exposed to the radiation produced by a xenon lamp (1.25 Watt/m2 at a wavelength of 420 nm) for a time determined by the variation of the gray scale variation of the standard n. 6 of blue wool. The test is performed at a temperature of 50° C.

With this test the light resistance of a surface behind glass is simulated. Color change evaluation is done visually through the gray scale with spectro-photometric measurement.

Tools used: XENON TEST CHAMBER of the company Q-SUN

TABLE 4

| LAB | Sample description | DL | DA | DB | DE | Evaluation |
|---|---|---|---|---|---|---|
| 62775 | PLANE | −0.31 | −0.34 | −1.49 | −1.56 | 4/5 |

Referring to table 4 above, the colour of a surface is measured using a three-axis Cartesian system where:

L represents the light-dark axis

A represents the red-green axis

B represents the yellow-blue axis

Therefore DL, DA and DB represent the variation for each color axis with respect to the initial reference.

The measurement is carried out by spectrophotometer and the value 4/5 indicates the variation of the color on the gray scale, or an almost imperceptible variation, using colorimetric references available to the operator.

Spring Hardness (Dur-O-Test)

Hard Surfaces—Internal Method

Method:

Using a special tool, consisting of a tungsten tip or a diamond point, to which pressure is applied by an adjustable spring, a mark is drawn on the painted surface. The Tungsten tip, when the applied forces range from 2N to 0.3N is used in opaque products to observe how the opacant is superficially lined; applying greater strength the film hardness is examined, understood as resistance to a pressure localized on a small surface. The diamond point, being able to engrave/cut the surface, allows to observe the scratch resistance of the product.

The tool is equipped with three springs (red and blue silver) at different voltages;

Silver from 0 to 300 g

Red from 0 to 1000 g

Blue from 0 to 2000 g

The spring is chosen by observing the first that leaves a mark by applying the maximum pressure (eg Silver 300 g). Different marks are made for different forces and each mark is evaluated in a scale from 1 to 5. The etching caused by the tip on the surface is evaluated after 24 h, in the observation booth described in all the regulations on painted surfaces.

1: Pronounced mark. The coating film is totally/partially raised or the mark is whitened.

2: Pronounced mark. The surface is deeply etched and is easily recognizable by touch.

The mark is visible from every direction. The lifting of the paint film is not observed.

3: Slight mark. Not distinguishable by touch and easily visible from many directions of observation.

4: Slight change of brightness only when the light source is reflected in the test surface, on the mark or very close to it and is reflected towards the eye of the observer, or some isolated marks just visible.

5: No visible change (no damage).

TABLE 5

| LAB Description of specimen | | | | | | | | | | | | |
|---|---|---|---|---|---|---|---|---|---|---|---|---|
| 62775 Plane | | | | | | | | | | | | |
| 20N | 15N | 10N | 6N | 5N | 4N | 3N | 2N | 1.5N | 1N | 0.7N | 0.5N | 0.3N |
| 4 | 4 | 4 | 4 | 4 | 4 | 5 | 5 | 5 | 5 | 5 | 5 | 5 |
| 1N | 0.7N | 0.5N | 0.3N | 0.1N | | | | | | | | |
| 4 | 4 | 4 | 5 | 5 | | | | | | | | |
| 62984 UVX5818F Edge | | | | | | | | | | | | |
| 20N | 15N | 10N | 6N | 5N | 4N | 3N | 2N | 1.5N | 1N | 0.7N | 0.5N | 0.3N |
| 4 | 4 | 4 | 4 | 4 | 4 | 5 | 5 | 5 | 5 | 5 | 5 | 5 |
| 1N | 0.7N | 0.5N | 0.3N | 0.1N | | | | | | | | |
| 4 | 4 | 4 | 5 | 5 | | | | | | | | |

The test was performed by analyzing the scratch generated by the tungsten tip starting from 0.5 mm from the upper edge up to 0.5 mm from the lower edge. From the report of each test it is clear that the performances obtained are identical both on the plane and on the edge of a three-dimensional element. The characterizing element is the high scratch resistance (Dur-O-TEST) for both surfaces. Currently it is not possible to obtain these results with a traditional UV paint cured with UV arc lamps, as the high quantity of opaque silicas and the type of resins used would give much lower chemical resistance and scratch resistance.

Using an Excimer lamp without the use of the mechanical system of the present invention it would be possible to obtain excellent performances on the surface but not on the edges.

The materials and dimensions of the invention as described above, illustrated in the accompanying drawings and claimed below, may be any according to requirements. Furthermore, all the details can be replaced with other technically equivalent ones, without departing from the scope of the present patent application.

The invention claimed is:

1. A system for cross-linking UV-curable paints applied to a support, comprising:

a painting area;

a pre-gelling zone;

a surface polymerization zone;

a final polymerization zone; and wherein, the surface polymerization zone is provided with:

a lower reflecting element;

an upper reflecting element;

two lateral reflecting elements;

at least one Excimer lamp; and at least two translation guides extending along a transport direction and laterally spaced from one another, the at least two translation guides configured to support the support at a bottom surface of the support, the at least two translation guides being configured to move the support in the transport direction, wherein each translation guide has an uppermost surface spaced above the lower reflecting element such that the uppermost surfaces of the at least two translation guides are arranged vertically between the lower reflecting element and the upper reflecting element, wherein the lower reflecting element is arranged laterally between the at least two translation guides, wherein each translation guide is configured to contact a portion of the bottom surface of the support such that remaining portions of the bottom surface of the support directly face the lower reflecting element without any intervening components and are spaced apart from the lower reflecting element by a distance;

wherein the lateral reflecting elements are provided with systems for adjusting the inclination with respect to the plane or for adjusting the distance to the support; and wherein the position of the Excimer lamp is independently adjustable.

2. The system according to claim 1, wherein at least one area of the pre-gelling and final polymerization zones is provided with:

a lower reflective element;

an upper reflective element;

at least one light source; and one or more translation guides for moving the support, said translation guides being such as to space the support by a distance with respect to the lower reflecting element.

3. The system according to claim 2, wherein the light source is chosen from:

LED lamps capable of emitting a radiation with a wavelength between 365 and 405 nm;

low power arc UV lamps such as gallium, mercury or iron lamps with a power between 10 and 50 W/cm or other UV lamps;

UV lamps capable of producing monochromatic wavelengths in the UV-C region (200-300 nm);

Gallium UV lamps or UV-LED lamps capable of emitting radiation with a wavelength between 300 and 420 nm;

mercury lamps with variable powers between 80 and 200 W/cm;

and related combinations.

4. The system according to claim 2, wherein the one or more translation guides are configured to move the support between each zone in the transport direction, and wherein each of the light sources is independently arranged above the support perpendicularly with respect to the transport direction or with an inclination up to 60°.

5. The system according to claim 2, wherein the lower, upper and lateral reflecting elements are chosen from: mirror-polished AISI 316 stainless steel mirrors or aluminum.

6. The system according to claim 2, wherein the support is moved by two of the one or more translational guides; and wherein the length of each of the light sources and of the Excimer lamp independently covers all the distance between the two translation guides d and protrudes on both sides for a distance of at least 10% with respect to the distance d.

7. The system according to claim 2, wherein the distance of moving the support using one or more translation guides is greater than 0.1 mm.

8. The system according to claim 1, in with Excimer lamps are used, capable of emitting a radiation with a wavelength of 172 nm and a power of between 0.5 and 50 Watt/cm, with water or air cooling and in an inert nitrogen atmosphere with oxygen levels between 1 and 1,000 ppm.

9. The system according to claim 1, which is realized as:

a single device where the pre-gelling steps (step 3), Excimer surface polymerization (step 4), final polymerization (step 5) are carried out continuously.

10. The system according to claim 1, wherein the Excimer lamp is arranged above the support perpendicularly with respect to the transport direction or with an inclination up to 60°.

11. A method of obtaining ultra-matt coated surfaces obtained by using UV cross-linkable coating products using the system of claim 1 comprising the following steps:

applying the UV cross-linkable coating product with a thickness from 30 to 300 μm;

optionally evaporating solvents and/or coalescents or water, pre-gelling using one or more radiation sources, and polymerizing and crosslinking the surface layer of the coating film using at least one Excimer lamp.

12. The method according to claim 11, wherein the support is a three-dimensional object, wherein after the polymerizing and crosslinking of the surface layer, each ultra-matt coated surface of the three-dimensional object has the same resistance to the squaring test carried out according to the UNI EN ISO 2409:2013 standard.

13. The system according to claim 1, wherein the support is a three-dimensional object.

14. The system according to claim 1, wherein the two lateral reflecting elements are in direct contact with the lower reflecting element.

15. The system according to claim 1, wherein the two lateral reflecting elements laterally surround outermost surfaces of the at least two translation guides.

16. The system according to claim 1, wherein a bottommost surface of the each translation guide is arranged below the lower reflecting element such that the lower reflecting element is arranged between the uppermost and the bottommost surfaces of the each translation guide.

17. A system for cross-linking UV-curable paints applied to a support, comprising:

a painting area;

a pre-gelling zone;

a surface polymerization zone;

a final polymerization zone; and wherein, the surface polymerization zone is provided with:

a lower reflecting element;

an upper reflecting element;

two lateral reflecting elements;

at least one UV radiation source; and at least two translation guides extending along a transport direction and laterally spaced apart from one another, the at least two translation guides configured to support the support at a bottom surface of the support, the at least two translation guides being configured to move the support in the transport direction, wherein each translation guide has an uppermost surface spaced above the lower reflecting element, wherein the lower reflecting element is arranged laterally between the at least two translation guides, and wherein each translation guide is configured to contact a portion of the bottom surface of the support.

18. The system according to claim 17, wherein the position of the at least one UV radiation source is independently adjustable.

19. The system according to claim 17, wherein remaining portions of the bottom surface of the support directly face the lower reflecting element without any intervening components.

20. The system according to claim 17, wherein uppermost surfaces of the at least two translation guides are arranged vertically between the lower reflecting element and the upper reflecting element.

* * * * *